(12) United States Patent  
Chew et al.

(10) Patent No.: US 8,099,685 B2
(45) Date of Patent: Jan. 17, 2012

(54) MODEL BASED MICRODEVICE DESIGN LAYOUT CORRECTION

(75) Inventors: Marko P Chew, Palo Alto, CA (US); Yue Yang, Cupertino, CA (US); Juan Andres Torres Robles, Wilsonville, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 550 days.

(21) Appl. No.: 12/184,089

(22) Filed: Jul. 31, 2008

(65) Prior Publication Data

US 2009/0113359 A1 Apr. 30, 2009

Related U.S. Application Data

(60) Provisional application No. 60/962,814, filed on Jul. 31, 2007.

(51) Int. Cl.
*G06F 17/50* (2006.01)
(52) U.S. Cl. .............. 716/54; 716/50; 716/51; 716/52; 716/55

(58) Field of Classification Search .............. 716/50–55
See application file for complete search history.

(56) References Cited

U.S. PATENT DOCUMENTS

| | | | |
|---|---|---|---|
| 6,430,737 B1* | 8/2002 | Cobb et al. | 716/52 |
| 6,453,457 B1* | 9/2002 | Pierrat et al. | 716/53 |
| 6,470,489 B1* | 10/2002 | Chang et al. | 716/52 |
| 6,516,459 B1* | 2/2003 | Sahouria | 716/52 |
| 7,131,101 B2* | 10/2006 | Pierrat et al. | 430/5 |
| 7,194,704 B2* | 3/2007 | Kotani et al. | 716/52 |
| 7,266,800 B2* | 9/2007 | Sezginer | 716/52 |
| 7,266,801 B2* | 9/2007 | Kotani et al. | 716/52 |
| 2005/0204322 A1* | 9/2005 | Kotani et al. | 716/10 |
| 2005/0235245 A1* | 10/2005 | Kotani et al. | 716/19 |
| 2006/0085772 A1* | 4/2006 | Zhang | 716/4 |
| 2009/0113359 A1 | 4/2009 | Chew et al. | |
| 2009/0119635 A1* | 5/2009 | Takahata | 716/20 |
| 2010/0023916 A1* | 1/2010 | Chew et al. | 716/19 |

* cited by examiner

*Primary Examiner* — Sun Lin

(57) ABSTRACT

Shapes neighboring a potential manufacturing fault within a microdevice design layout are identified. Models are employed to determine the affect of the shapes upon the potential manufacturing fault. Possible adjustments to the shapes are modeled. The possible adjustments facilitating resolution of the potential manufacturing fault.

28 Claims, 13 Drawing Sheets

| | | | | | | |
|---|---|---|---|---|---|---|
| 13.615 | 16.395 | 13.615 | 17.595 | 0.0237 | 0 | 0.0676 |
| 13.415 | 16.395 | 13.415 | 17.110 | 0.0111 | 0 | 0.1446 |
| 14.015 | 16.295 | 14.015 | 17.995 | 0.0036 | 0 | 0.4475 |
| 13.815 | 16.395 | 13.815 | 17.795 | 0.0020 | 0 | 0.8153 |
| 13.615 | 17.595 | 13.515 | 17.595 | 0.0011 | 3 | 1.4408 |
| 13.515 | 17.815 | 13.515 | 18.335 | 0.0001 | 0 | 12.6474 |
| 13.415 | 17.795 | 13.215 | 17.795 | -0.0006 | 2 | 2.5876 |
| 13.815 | 17.795 | 13.715 | 17.795 | -0.0008 | 2 | 2.1016 |
| 13.215 | 17.795 | 13.215 | 17.995 | -0.0009 | 1 | 1.8240 |
| 13.615 | 17.815 | 13.515 | 17.815 | -0.0026 | 2 | 0.6264 |
| 13.415 | 17.615 | 13.415 | 17.795 | -0.0026 | 1 | 0.6230 |
| 13.115 | 17.615 | 13.415 | 17.615 | -0.0031 | 3 | 0.5161 |
| 13.415 | 17.110 | 13.315 | 17.11 | -0.0068 | 2 | 0.2347 |

Fig. 7

| | | | | | | |
|---|---|---|---|---|---|---|
| 13.615 | 17.595 | 13.515 | 17.595 | 0.0021 | 3 | 0.7658 |
| 13.815 | 17.795 | 13.715 | 17.795 | 0.0004 | 3 | 3.9939 |
| 13.415 | 17.795 | 13.215 | 17.795 | 0.0003 | 3 | 4.8937 |
| 13.215 | 17.795 | 13.215 | 17.995 | -0.0001 | 1 | 13.7094 |
| 14.015 | 16.295 | 14.015 | 17.995 | -0.0004 | 1 | 3.9599 |
| 13.515 | 17.815 | 13.515 | 18.335 | -0.0010 | 1 | 1.6547 |
| 13.115 | 17.615 | 13.415 | 17.615 | -0.0012 | 3 | 1.3379 |
| 13.415 | 17.110 | 13.315 | 17.110 | -0.0023 | 2 | 0.6821 |
| 13.415 | 17.615 | 13.415 | 17.795 | -0.0029 | 1 | 0.5526 |
| 13.615 | 17.815 | 13.515 | 17.815 | -0.0031 | 2 | 0.5207 |
| 13.415 | 16.395 | 13.415 | 17.110 | -0.0100 | 1 | 0.1607 |
| 13.815 | 16.395 | 13.815 | 17.795 | -0.0124 | 1 | 0.1287 |
| 13.615 | 16.395 | 13.615 | 17.595 | -0.0943 | 1 | 0.0170 |

Fig. 9

MODEL BASED MICRODEVICE DESIGN LAYOUT CORRECTION

RELATED APPLICATIONS

This application claims priority under 35 U.S.C. §119(e) to U.S. Provisional Patent Application No. 60/962,814 entitled "FPOPC-Based Hint Generation for LFD Integration to P&R," filed on Jul. 31, 2007, and naming Marco Chew et. al. as inventors, which application is incorporated entirely herein by reference.

FIELD OF THE INVENTION

The invention relates to the field of circuit design layout correction. More specifically, various embodiments of the invention relate to employing models to evaluate and propose adjustments to a circuit design layout.

BACKGROUND OF THE INVENTION

Electronic circuits, such as integrated microcircuits, are used in a variety of products, from automobiles to microwaves to personal computers. Designing and fabricating microcircuit devices typically involves many steps, sometimes referred to as the "design flow." The particular steps of a design flow often are dependent upon the type of microcircuit, its complexity, the design team, and the microcircuit fabricator or foundry that will manufacture the microcircuit. Typically, software and hardware "tools" verify the design at various stages of the design flow by running software simulators and/or hardware emulators, these steps aid in the discovery of errors in the design and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various materials to manufacture the circuit. Typically, a designer will select groups of geometric elements representing circuit device components (e.g., contacts, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

IC layout descriptions can be provided in many different formats. The Graphic Data System II (GDSII) format is a popular format for transferring and archiving 2D graphical IC layout data. Among other features, it contains a hierarchy of structures, each structure containing layout elements (e.g., polygons, paths or poly-lines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in IC layout designs that are employed to manufacture integrated circuits. Once the microcircuit device design is finalized, the layout portion of the design can be used by fabrication tools to manufacturer the device using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor circuit could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed (or non-exposed areas are etched away, leaving behind exposed areas on the epitaxial layer, (i.e., areas no longer covered by the nitride layer). Specific shapes or patterns on these exposed areas then are subjected to a diffusion or ion implantation process. This causes dopants, (for example, phosphorus) to enter the exposed epitaxial layer and form negative wells. This process of depositing layers of material on the substrate or subsequent material layers, and then exposing specific patterns to radiation, etching, and dopants or other diffusion processes, is repeated a number of times. This series of steps allows the different physical layers of the circuit to be manufactured.

Each time that a layer of material is exposed to radiation, a mask must be created to expose only desired areas to the radiation, and to protect the other areas from exposure. Each mask is created from circuit layout data. That is, the geometric elements described in layout design data define the relative locations or areas of the circuit device that will be exposed to radiation through the mask. A mask or reticle writing tool is used to create the mask or reticle based upon the layout design data, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. This difficulty often results in defects where the intended image is not accurately "printed" onto the substrate during the photolithographic process, creating flaws in the manufactured device.

To address this problem, one or more resolution enhancement techniques are often employed. Examples of various resolution enhancement techniques are discussed in "Resolution Enhancement Technology: The Past, the Present, and Extensions for the Future," Frank M. Schellenberg, Optical Microlithography XVII, edited by Bruce W. Smith, *Proceedings of SPIE Vol.* 5377, which article is incorporated entirely herein by reference. One of these techniques, radiation amplitude control, is often facilitated by modifying the layout design data employed to create the lithographic mask. One way to implement this technique, for example, is to adjust the edges of the geometric elements in the layout design so that the mask created from the modified layout data will control the radiation amplitude in a desired way during a lithographic process. The process of modifying the layout design data in this manner is often referred to as "optical proximity correction" or "optical process correction" (OPC).

As previously noted, a layout design is made up of a variety of geometric elements. In a conventional optical proximity correction process, the edges of the geometric elements (which are typically polygons) are fragmented, and the edge fragments are rearranged or edited to effect the desired modifications. The edge fragments are typically reconfigured to ensure the design conforms to manufacturing constraints, such as the minimum size of a fragment or the minimum proximity between adjacent fragments. Additionally, features that will increase the fidelity of the photolithographic process are often added to the design. For example, some optical proximity correction processes will reconfigure the edge fragments of a polygon to create serifs at one or more corners.

As microcircuit devices get smaller and more complex, additional manufacturing processes are often employed to fabricate the devices. For example, chemical-mechanical planarization is often used both to flatten the topography and to bring certain features of the topography into the depth of field of the lithographic process. Additionally, as described above, many etching and diffusing steps are performed during the fabrication process. These additional processes provide opportunities for other manufacturing defects to manifest themselves. Accordingly, any manufacturing defect, whether due to the lithographic process or some other process such as chemical-mechanical planarization will be referred to herein as a "fault," a "potential fault," or a "potential manufacturing fault."

Due to the various processes involved in manufacturing, it is increasingly difficult to predict and simulate all potential faults that could manifest during fabrication. Prior to a layout design being finalized and a mask created, the layout must be examined to ensure that the design does not have potential manufacturing faults. If there are potential faults, then these potential faults must be corrected. While performing optical proximity correction on layout design data can improve the fidelity of the lithographic process, the correction process can be expensive in terms of both computing resources and processing time. Layout designs can be very large, and even one layout data file for a single layer of a field programmable gate array may be approximately 58 gigabytes. Accordingly, performing even a single optical proximity correction process on a design is computationally intensive. Repeating an optical proximity correction process to correct remaining potential faults then only adds to the time required to finalize the layout design. On the other hand, manually correcting potential faults is very time consuming as well. The time required for performing optical proximity correction only increases as the feature size of designs decrease and as the number of features in a given design increases. Additionally, potential faults due to other procedures in the manufacturing process, for example chemical-mechanical planarization, require correction procedures in addition to optical proximity correction. This further complicates and adds costs in the form of computing resources and engineer time to address.

BRIEF SUMMARY OF THE INVENTION

Aspects of the invention relate to techniques for evaluating microdevice design layout data and determining adjustments that, if implemented in the layout design, may reduce or correct potential manufacturing faults.

Various implementations of the invention provide methods for compiling a set of potential adjustments or corrections to microdevice design layout data. According to some implementations, features nearby a potential fault are extracted. A model is used to determine the contribution of these neighboring features to the potential fault. Adjustments then are made to the neighboring features, and the effect of these adjustments upon the potential fault are evaluated using the model. In some implementations, the potential adjustments to the microdevice design layout data are ranked. In further examples of the invention, the techniques are used on multiple potential faults within the microdevice design layout design. Additionally, in some implementations, these techniques are used in addition to or in conjunction with other fault correction procedures, such as optical proximity correction.

These and other features of the invention will be apparent upon consideration of the following detailed description.

BRIEF DESCRIPTION OF THE DRAWINGS

The present invention will be described by way of illustrative embodiments shown in the accompanying drawings in which like references denote similar elements, and in which:

FIG. 7 illustrates the results of an implementation of various embodiments of the present invention applied to an example microdevice design layout.

FIG. 9 illustrates the results of an implementation of various embodiments of the present invention applied to the example microdevice design layout of FIG. 2.

DETAILED DESCRIPTION OF ILLUSTRATIVE EMBODIMENTS

The disclosed technology includes all novel and unobvious features, aspects, and embodiments of the system and methods described herein both alone, and in various combinations and sub-combinations thereof. The disclosed features, aspects, and embodiments can be used alone or in various novel and unobvious combinations and sub-combinations with one another.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine" to describe the disclosed methods. Such terms are high-level abstractions of the actual operations that are performed. The actual operations that correspond to these terms will vary depending on the particular implementation and are readily discernible by one of ordinary skill in the art.

Some of the methods described herein can be implemented in software stored on a computer-readable medium and executed on a computer. Some of the disclosed methods, for example, can be implemented as part of a computer-implemented electronic design automation (EDA) tool. Such methods can be executed on a single computer or a networked computer. For clarity, only those aspects of the software germane to these disclosed methods are described; product details well known in the art are omitted.

Example Operating Environment

Figure 1:
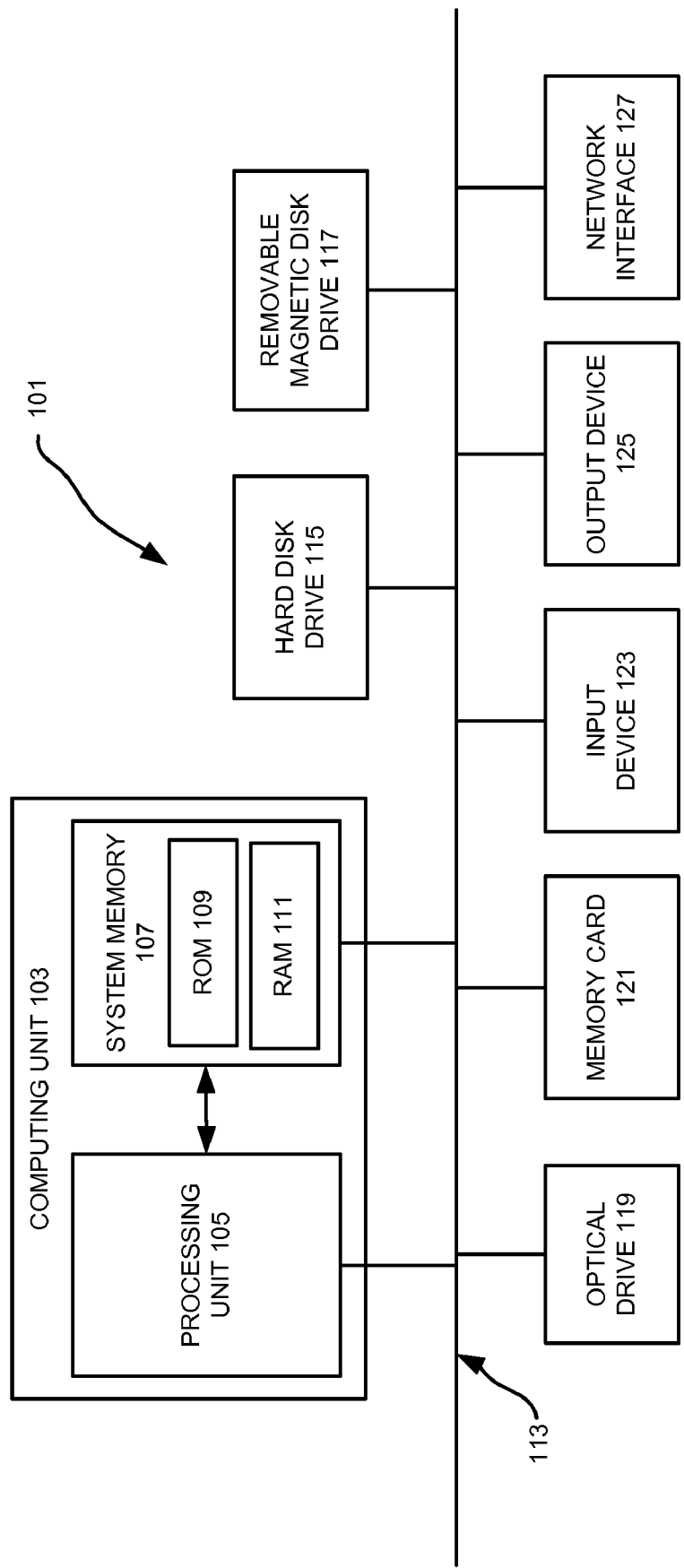
FIG. 1 illustrates an example computing device.

As described above, various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor or a combination of two or more microprocessors. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and is not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Model-Based Fault Correction

As discussed in detail above, microdevice design layout data is generally preprocessed to ensure that the layout both complies with the design specification and that the layout will be manufactured without any faults. There are a number of techniques available to designers, for example optical proximity correction, which processes the geometric elements, or polygons in the microdevice design layout and adjusts them according to specified process parameters. As also previously noted, performing these techniques is time consuming and computationally expensive. Accordingly, various methods and systems are disclosed herein that provide for analyzing a microdevice design layout and employing a model-based methodology to compile a set of possible adjustments to the microdevice design layout.

Figure 2:
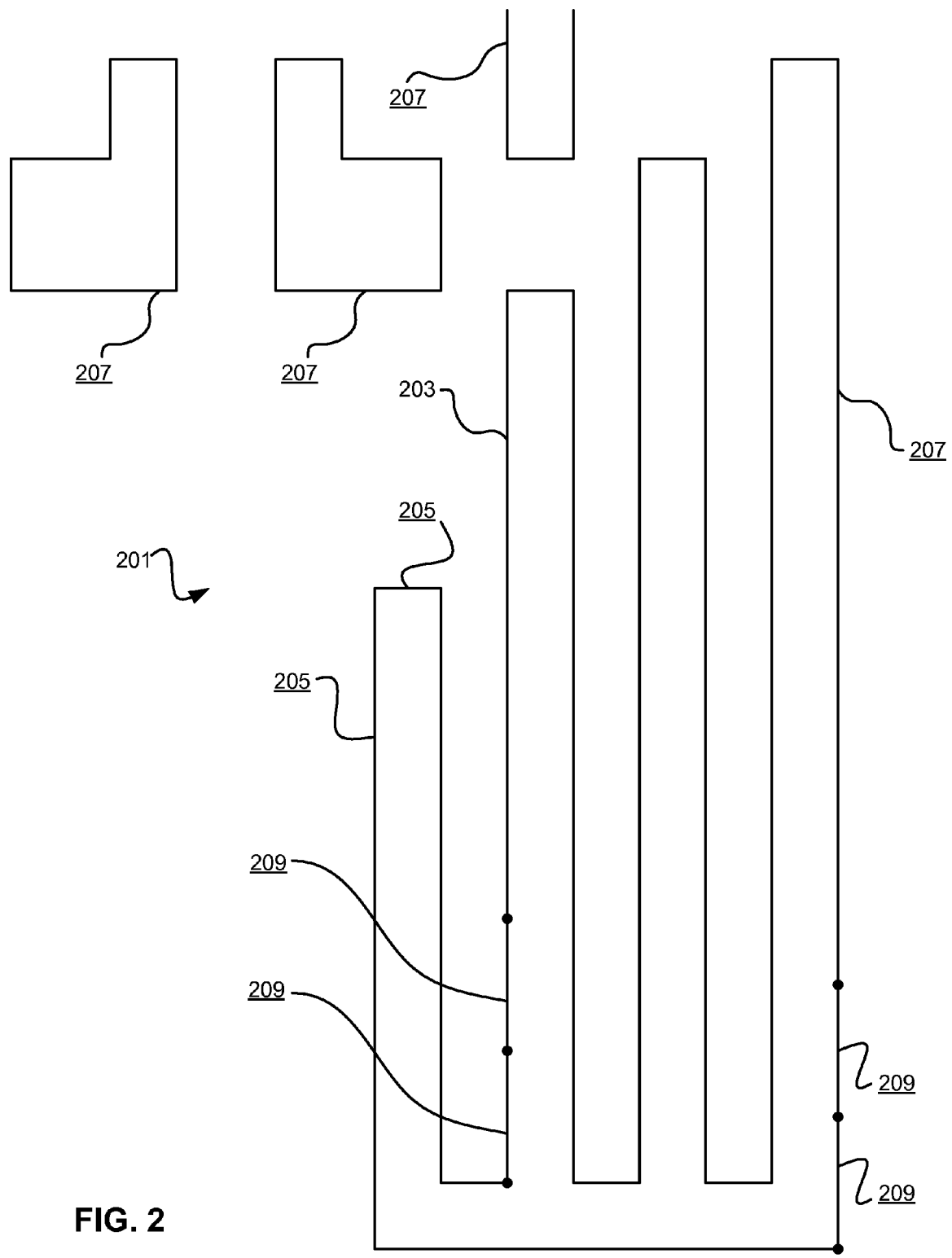
FIG. 2 is illustrative of a graphical representation of an example microdevice design layout.

FIG. 2 illustrates an example of a portion of a microdevice design layout 201 As detailed above microdevice design layout data, although stored in electronic format, is often discussed or represented in graphical format as illustrated by the microdevice design layout 201 of FIG. 2. Additionally, the graphical representation of microdevice design layout data, such as the microdevice design layout 201, is facilitated by representing the features as polygons. The polygons are composed of edges and edge fragments. The microdevice design layout 201 of FIG. 2 contains a potential manufacturing fault 203 and edges 205. The edges 205 combine to form polygons 207. Additionally, the edges 205 are often fractured to form edge fragments 209. These geometric elements of the microdevice design layout 201 are used by microdevice design layout data processing tools. More particularly, the edges 205, the edge fragments 209, and the polygons 207 are often used by these processing tools to detect and correct potential manufacturing faults.

Those of skill in the art will appreciate that the decision to fragment edges and the size of edge fragments may vary from implementation to implementation. Accordingly, the size and location of edge fragments within a particular microdevice design layout will vary depending upon the particular implementations, possible user input, design constraints, or manufacturing constraints.

Figure 3:
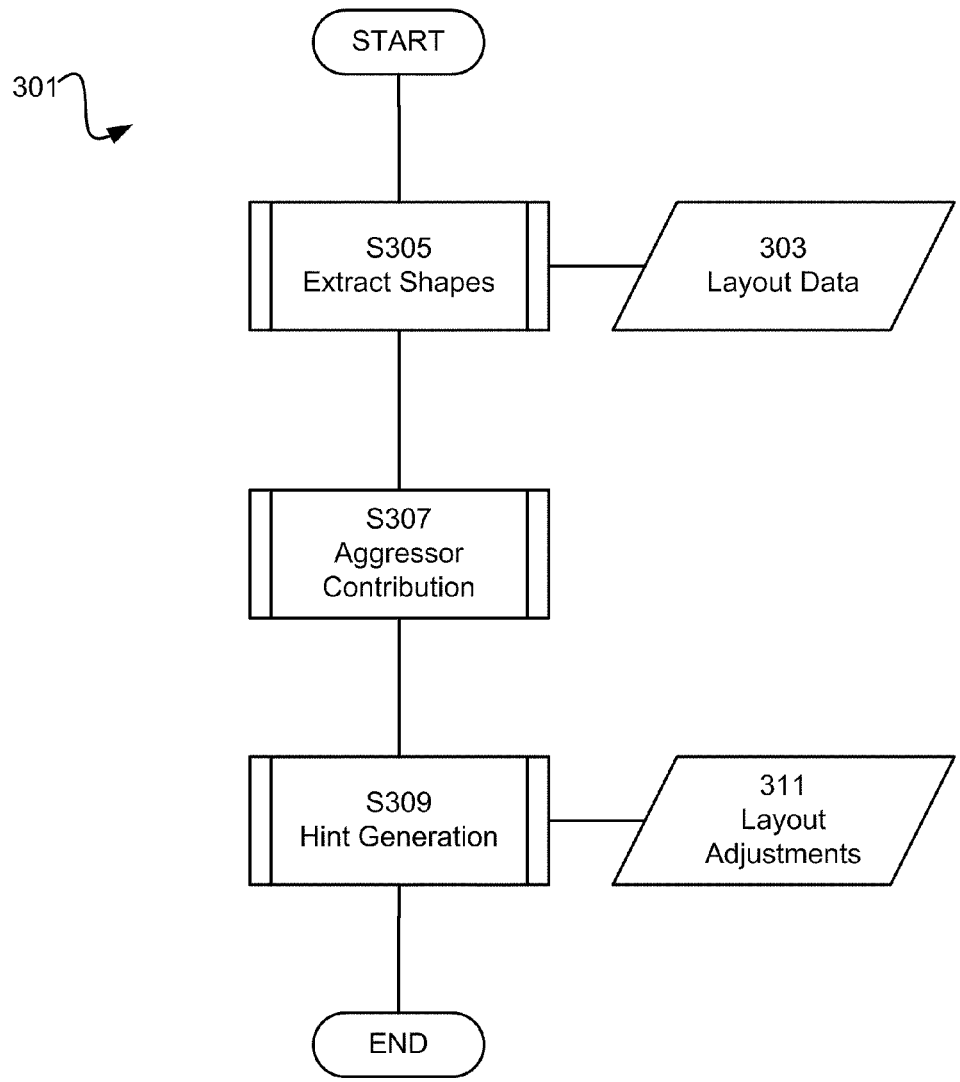
FIG. 3 illustrates a flow chart describing an implementation of various embodiments of the present invention.

FIG. 3 illustrates an example of a model-based layout correction assessment process 301 that may be implemented according to various embodiments of the present invention. As seen in FIG. 3, the correction assessment process 301 may be used to process a portion of a microdevice design layout 303. For example, the correction assessment process 301 could be used to process the microdevice design layout 201 of FIG. 2. As can be seen in FIG. 3, the correction assessment process 301 includes a step for extracting shapes S305, a step for identifying aggressor shapes S307, and a step for simulating possible adjustments to the shapes S309. Additionally, the model-based layout correction assessment process 301 produces a set of possible adjustments 311, which may be applied to the microdevice design layout 303.

In various embodiments of the invention, the microdevice design layout 303 contains a potential manufacturing fault. For example, the microdevice design layout 201 of FIG. 2 contains the potential manufacturing fault 203, which is a pinching type fault. The step for extracting shapes S305 identifies a plurality of shapes neighboring the potential manufacturing fault. In some embodiments of the invention, the step for extracting shapes S305 identifies entire polygons and associates the identified polygons as the shapes neighboring the potential fault. In other embodiments, the step for extracting shapes S305 identifies edges and associates the identified edges as the shapes neighboring the potential fault. Still, in further embodiments, the step for extracting shapes S305 identifies edge fragments and associates the identified edge fragments as the shapes neighboring the potential fault. With various embodiments of the present invention, a vector is used to store the identified shapes, as illustrated by Equation 1.

$$e_0 e_1 e_2 \ldots e_n \qquad 1$$

More particularly, as disclosed the model-based layout correction assessment process 301 may be utilized to process the microdevice design layout 201. Accordingly with various implementations of the invention, the step for extracting shapes S305 identifies the polygons 207 near the potential manufacturing fault 203. With other implementations of the invention, the step for extracting shapes S305 identifies the edges 205 near the potential manufacturing fault 203. Still, with other implementations of the invention, the step for extracting shapes S305 identifies the edge fragments 209 near the potential manufacturing fault 203. With various implementations of the present invention, the vector represented by Equation 1 is utilized to store the locations of the extracted shapes, be the extracted shapes, edges, polygons, or edge fragments.

Contour Model

A model is employed in both the step for identifying aggressor shapes S307 and the step for simulating possible adjustments to the shapes S309. In various embodiments of the invention, the model-based layout correction assessment process 301 utilizes a pre-calibrated model. While in other embodiments of the invention, the model-based layout correction assessment process 301 calibrates the model prior to performing the step for identifying aggressor shapes S307 and the step for simulating possible adjustments to the shapes S309.

Figure 4:
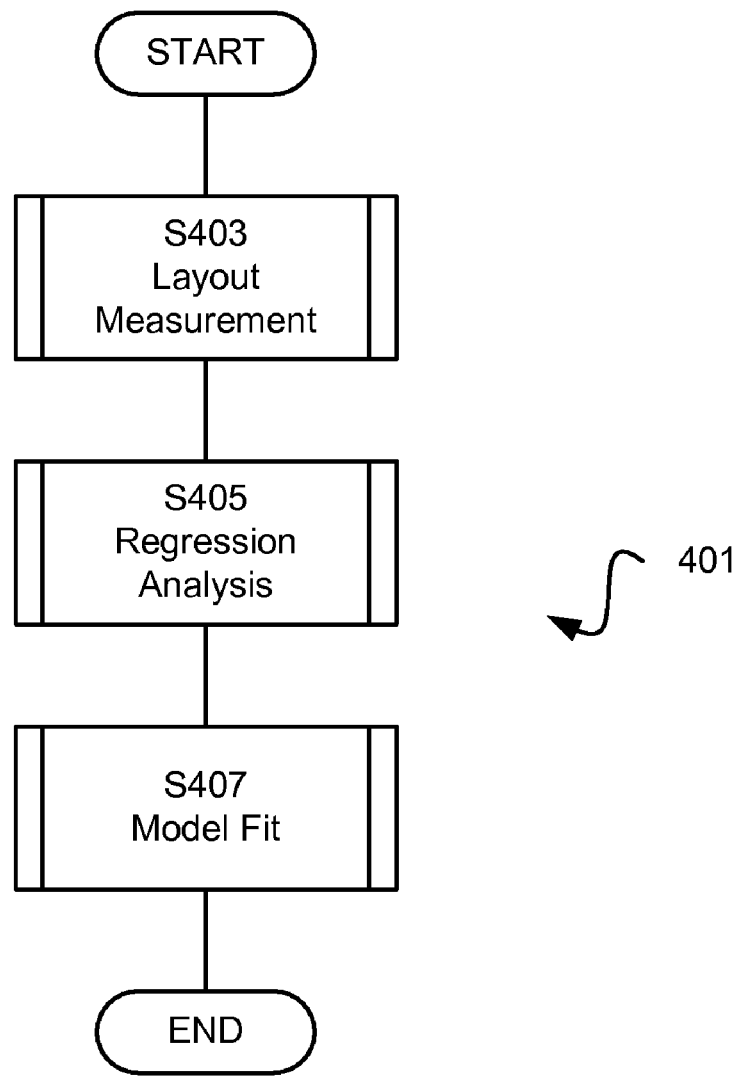
FIG. 4 illustrates a flow chart describing an implementation of various embodiments of the present invention.

FIG. 4 illustrates an example of a model calibration flow 401 that may be implemented according to various embodiments of the present invention. As seen in FIG. 4, the model calibration flow includes a step for measuring the layout S403, a step for performing regression analysis S405, and a step for performing model fitting S407.

Figure 5:
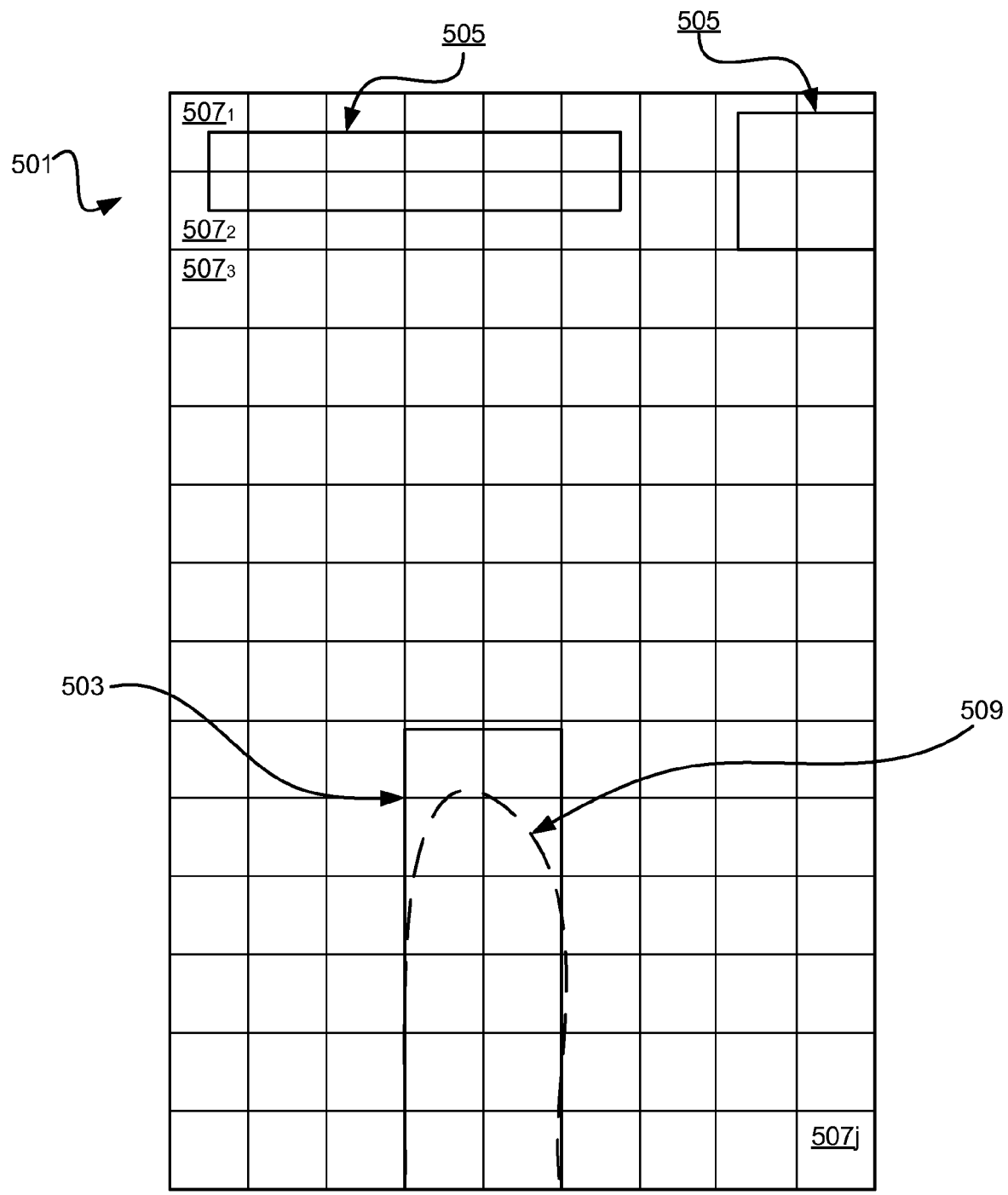
FIG. 5 is illustrative of a graphical representation of an example microdevice design layout.

In various embodiments of the invention, the densities are measured by superimposing a grid over the potential manufacturing fault. For example, FIG. 5 illustrates a microdevice design layout 501, including a target polygon 503, neighbor polygons 505, and density kernels 507. The target polygon 503 contains a potential manufacturing fault 509. For each of the density kernels 507, a density measurement is taken. With some embodiments of the invention, the density measurement is the difference between the edge of the target polygon 503 and the center of the density kernel 507. In various embodiments of the invention, a vector of densities is formed, as shown in Equation 2.

$$[1 d_1 d_2 \ldots d_j] \qquad 2$$

With various embodiments of the invention, the step for measuring the layout S403 measures the contour and densities of a representative layout of the microdevice design layout data 303. With some embodiments, the contours are approximated using a Manhattan distance approximation. While with other embodiments of the invention, the contours are approximated by their orthogonal convexity. Additionally, with various embodiments of the invention, a vector of contour coefficients is formed, as shown in Equation 3.

$$\begin{bmatrix} c_0 \\ c_1 \\ c_2 \\ \vdots \\ c_j \end{bmatrix} \qquad 3$$

With various embodiments of the invention, the step for performing regression analysis S405 is completed by way of a linear regression method. For example, a single value decomposition (SVD) least squares method. Those of skill in the art will appreciate that many tools exists for performing regression analysis, and furthermore many tools exists for the single value decomposition least squares method of regression analysis.

In various embodiments of the invention a Taylor series expansion model may be used. For example, Equation 4 illustrates a model in the form of a Taylor series expansion, which may be used to model the microdevice design layout 303.

$$f = c_0 + \sum c_i d_i + \sum_i \sum_{j=i} c_{ij} d_i d_j \qquad 4$$

With various embodiments of the invention, the model is a polynomial. For example, Equation 5 illustrates a model in the form of a polynomial, which may be used to model the microdevice design layout 303.

$$f = c_0 + \sum_{i=1}^{j} c_i d_i \qquad 5$$

Still, with other implementations of the invention, the model is linear, as illustrated in Equation 6.

$$f = c_0 + \Sigma c_i d_i \qquad 6$$

Still, various other implementations of the invention may utilize a cross-term model, as illustrated in Equation 7.

$$f = c_0 + \Sigma c_i d_i + \Sigma \Sigma c_{ij} d_i d_j \qquad 7$$

In various embodiments of the invention, the models described by Equations 4, 5, 6, and 7 are used during the step for identifying aggressor shapes S307 and the step for simulating possible adjustments to the shapes S309. Accordingly, those of skill in the art will appreciate that the model incorporates the density measurements and the contour approximations of the microdevice design layout. For example, those represented by Equations 2 and 3.

It should be appreciated that the size of the grid illustrated in FIG. 5 may vary for different implementations of the invention, or even within the same implementations of the invention. Additionally, those of skill in the art will appreciate that the size of the grid will affect the accuracy of the model as well as the utility of the model-based layout correction assessment process 301. A window of 5 to 25 microns in size is suitable for some applications, while a window of 30 to 50 microns in size is suitable for other applications. The microdevice design layout and the technology underlying the design itself as well as the manufacturing process dictate the preferred window size.

Those of skill in the art will appreciate that a multitude of tools exist to aid in the creation and utilization of the chosen model. For example, MATLAB by The Mathworks, Inc. of Natick, Mass., or Mathematica by Wolfram Research, Inc. of Champaign, Ill. Additionally, the chosen model may be implemented in proprietary circuit analysis tools such as Calibre by Mentor Graphics, Inc. of Wilsonville, Oreg., or Tachyon OPC by Brion, Inc. of Santa Clara, Calif.

Aggressor Identification

Figure 6:
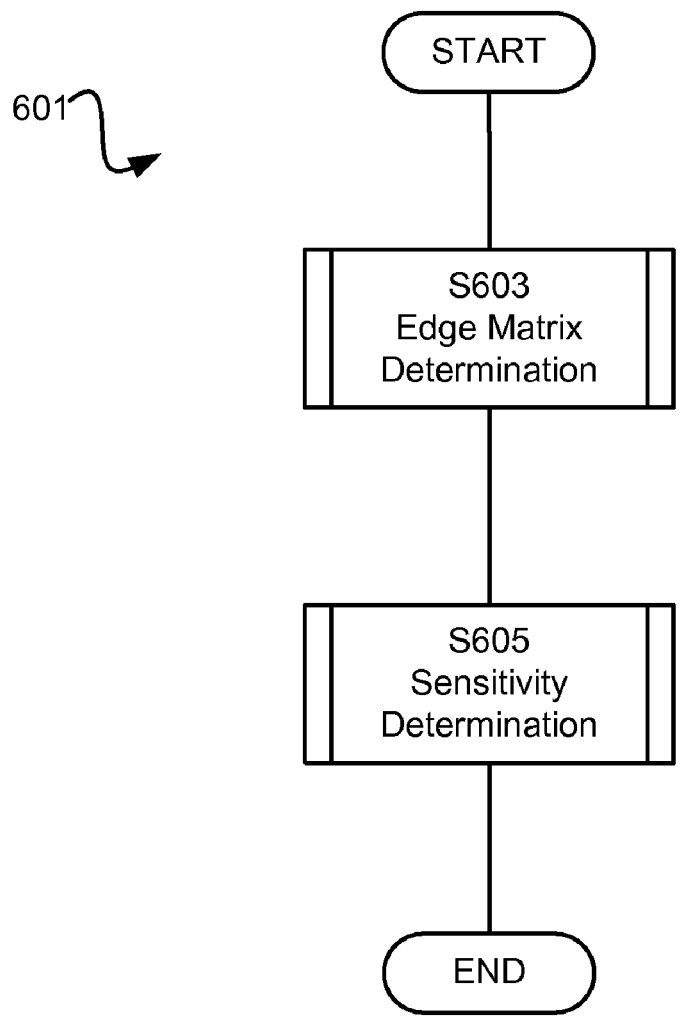
FIG. 6 illustrates a flow chart describing an implementation of various embodiments of the present invention.

FIG. 6 illustrates an example aggressor identification flow 601, which may be implemented according to various embodiments of the present invention to perform the step for identifying aggressor shapes S307. As can be seen in FIG. 6, the aggressor identification flow 601 includes a step for determining a contour density S603 and a step for determining the contour sensitivity S605.

With various embodiments of the present invention, the step for determining a contour density S603 is performed by multiplying the vectors in Equation 3 by the vector in Equation 2, as shown in Equation 8.

$$L = \begin{bmatrix} 1 & d_1 & d_2 & \ldots & d_j \end{bmatrix} \begin{bmatrix} c_0 \\ c_1 \\ c_2 \\ \vdots \\ c_j \end{bmatrix} \qquad 8$$

Those of skill in the art will appreciate that with various implementations that employ a pre-calibrated model, the density and contour measurements used during the step for identifying aggressor shapes S307, may be determined during the step for identifying aggressor shapes S307. As opposed to determined during the model calibration flow 401. Alternatively, in other implementations of the invention, a method separate from the model calibration flow 401 and the step for identifying aggressor shapes S307 is used to determine the density and contour measurements.

In various embodiments of the present invention, the step for determining the contour sensitivity S605 is performed by measuring how the contour density changes with respect to the shapes extracted during the step for extracting shapes S305. For example, measuring how the contour density changes with respect to the edges, as illustrated by Equation 9.

$$\frac{\partial l}{\partial e_j} \qquad 9$$

As described above, with some implementations, the edges are extracted and processed, while with other embodiments, the entire polygons are extracted and processed, still with other embodiments, the edge fragments are extracted and processed. Equation 9 illustrates measuring the gradient of the density measurements and contour approximations with respect to the extracted shapes.

FIG. 7 illustrates the results of an implementation of various embodiments of the present invention applied to an example microdevice design layout. Each row represents a different edge. Columns 1, 2, 3, and 4 identifying the respective edges coordinates, column 5 identifying the gradient of the contour density with respect to the edge, column six and column seven identify the direction and distance of a possible adjustment to the respective edges. In various implementations of invention, the direction and distance of a possible adjustment to the respective edges is determined in the step for simulating possible adjustments to the shapes S309.

Possible Layout Adjustment Simulation

Figure 8:
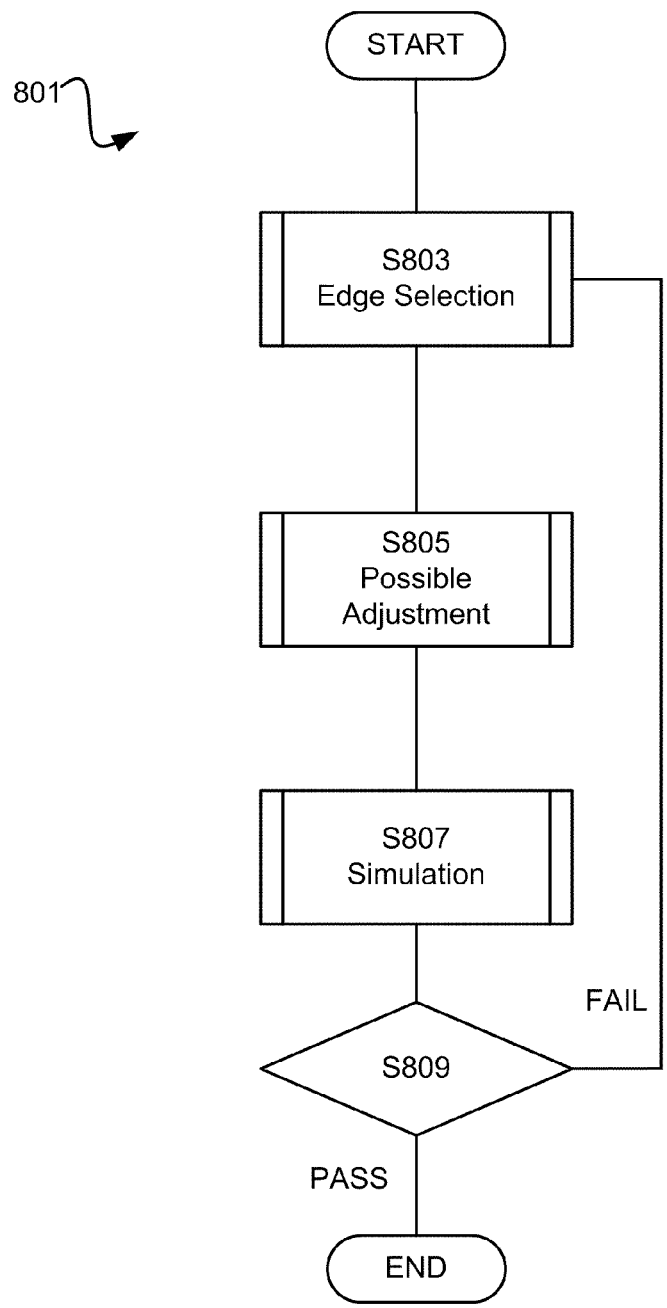
FIG. 8 illustrates a flow chart describing an implementation of various embodiments of the present invention.

As described above, FIG. 3 illustrates a model-based layout correction assessment process 301, which may be implemented according to various embodiments of the present invention. The model-based layout correction assessment process 301 provides a step for simulating possible adjustments to the shapes S309. FIG. 8 illustrates a possible adjustment simulation flow 801 that may be implemented according to various embodiments of the present invention. The possible adjustment simulation flow 801 includes a step for selecting an edge S803, a step for selecting a possible adjustment to the edge S805, a step for simulating the affect of the possible adjustment to the edge S807, and a decision step S809.

The step for selecting an edge S803 is performed by selecting the edge with the largest gradient of Equation 9 first. In other implementations of the invention, the edge is selected randomly. Still, in other implementations of the invention, the edge is selected based upon location of the edge related to the potential manufacturing fault.

The step for selecting a possible adjustment to the edge S805 is selected based upon the gradient of Equation 9. In other implementation of the invention, the possible edge adjustment is selected based upon user input. Still, with other implementations, the possible edge adjustment is selected from a range. The range may be specified by the user or dictated by the underlying microdevice design layout technology and manufacturing process.

The step for simulating the affect of the possible adjustment to the edge S807 is performed by utilizing the chosen model to determine the amount of change necessary to resolve the potential manufacturing defect. For example, various embodiments of the present invention determine the affect of the change or the required change to resolve the hotspot by Equation 10.

$$d_{edge} = l(\Delta e_j) \qquad 10$$

With various implementations of the invention, multiple edge movements are simulated. More particularly, possible adjustments for multiple edges are simulated. Alternatively, multiple possible adjustments for a single edge or multiple edges may be simulated.

In various implementations of the invention the possible adjustments are made to edge fragments. Still, with other implementations of the invention the possible adjustments are made to the entire polygon.

Additionally, with various implementations of the present invention, the possible adjustments are ranked and provided as "hints" to the user. The hints may be stored in vector format as illustrated in FIGS. 7 and 9, or the hints may be formatted into a structure suitable for viewing geometric results. For example, the Relational Database Format (RDB) usable by Calibre, available from Mentor Graphics Corporation of Wilsonville, Oreg.

Exemplary Model-Based Fault Correction

FIG. 9 illustrates the results of an implementation of various embodiments of the present invention to the example microdevice design layout of FIG. 2. Similar to FIG. 7, columns 1, 2, 3, and 4 identify the coordinates of the respective edge represented by each row. Column 5 identifies the gradient of the contour density with respect to the edge. Column six and column seven identify the direction and distance of a possible adjustment to the respective edges, or a "hint" to resolve the potential manufacturing fault 203.

Figure 10:
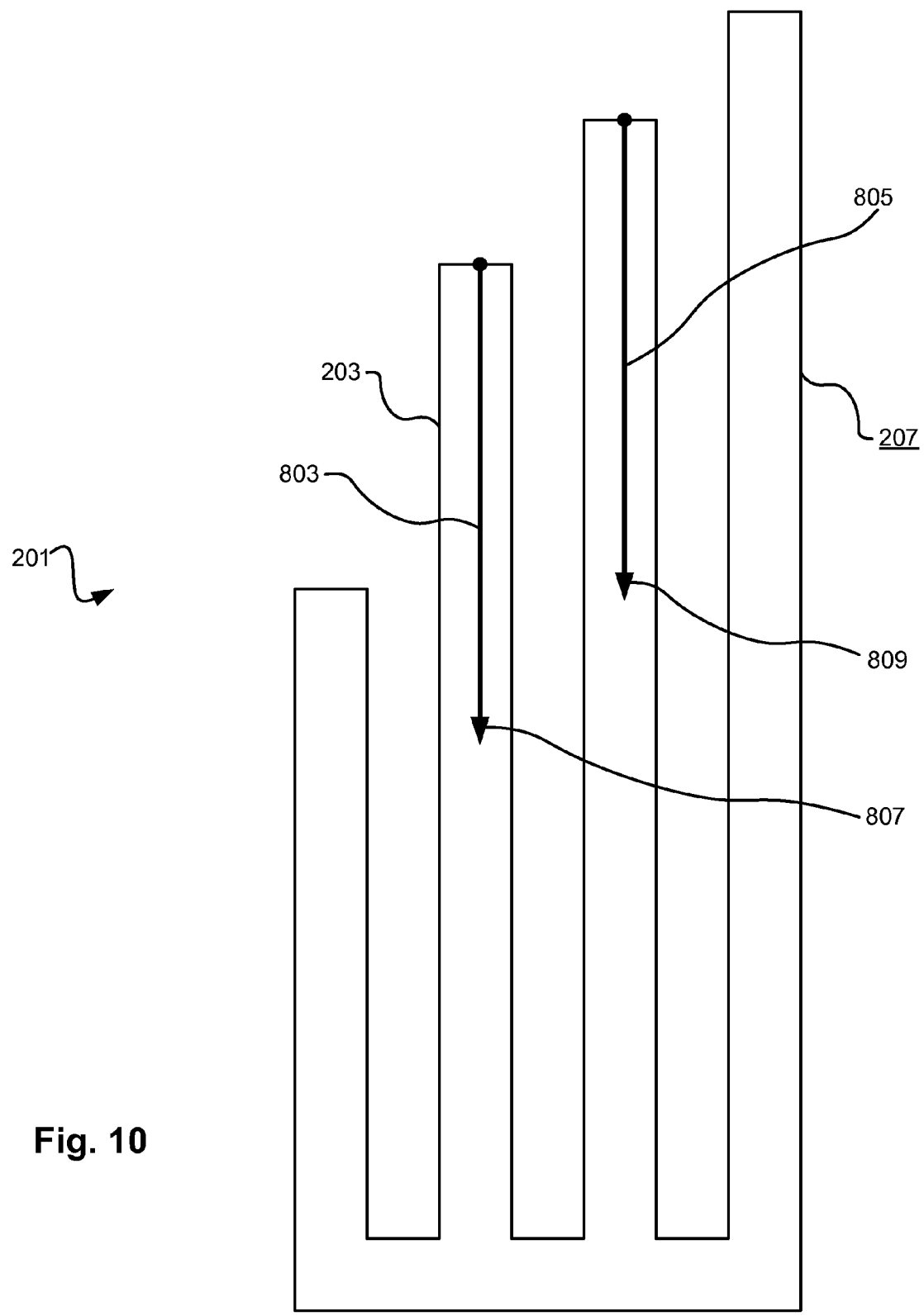
FIG. 10 illustrates the example microdevice design layout of FIG. 2, highlighting possible adjustments to the shapes.
Figure 11:
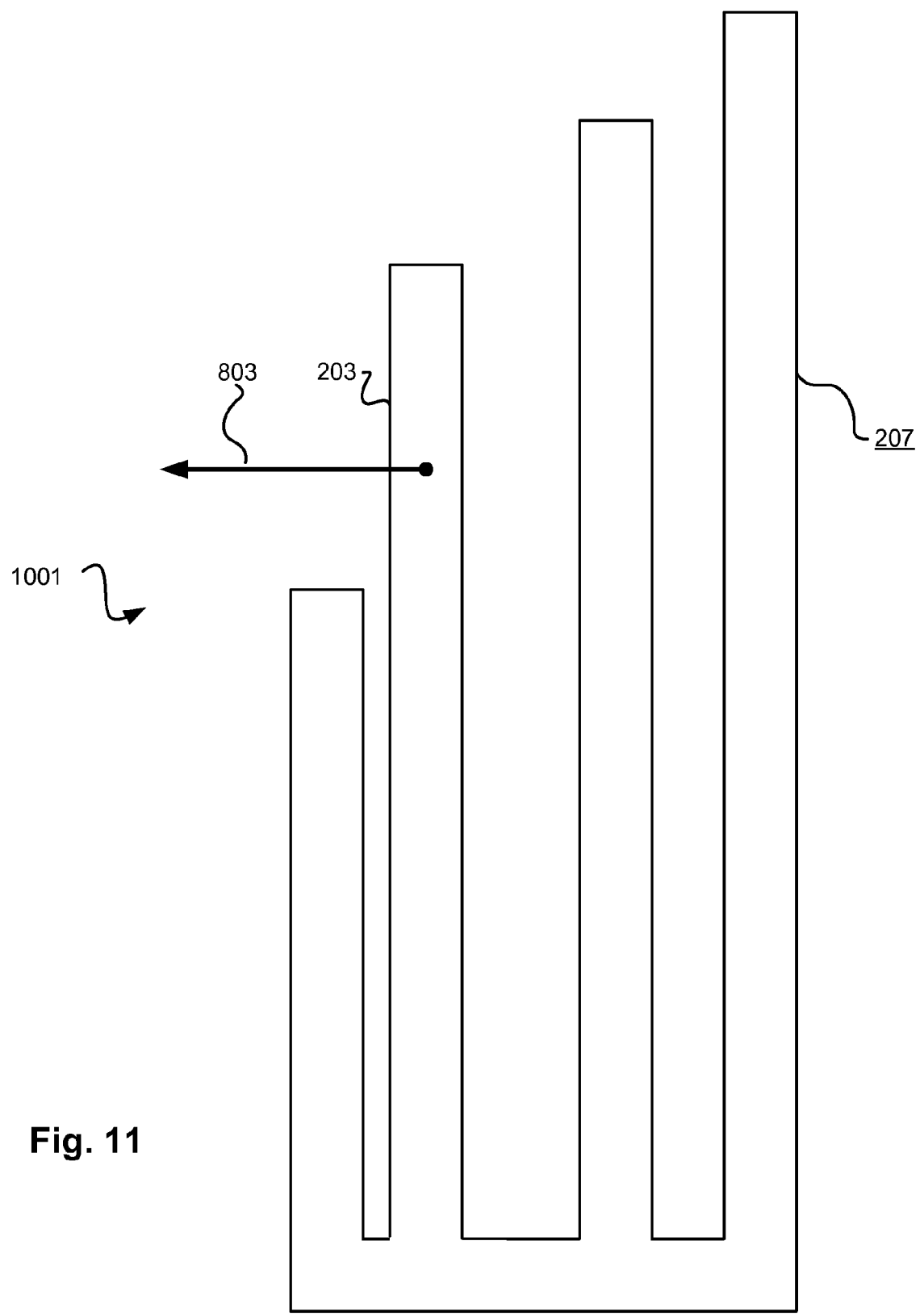
FIG. 11 illustrates the example microdevice design layout of FIG. 2 with a possible adjustment to the shapes implemented.
Figure 12:
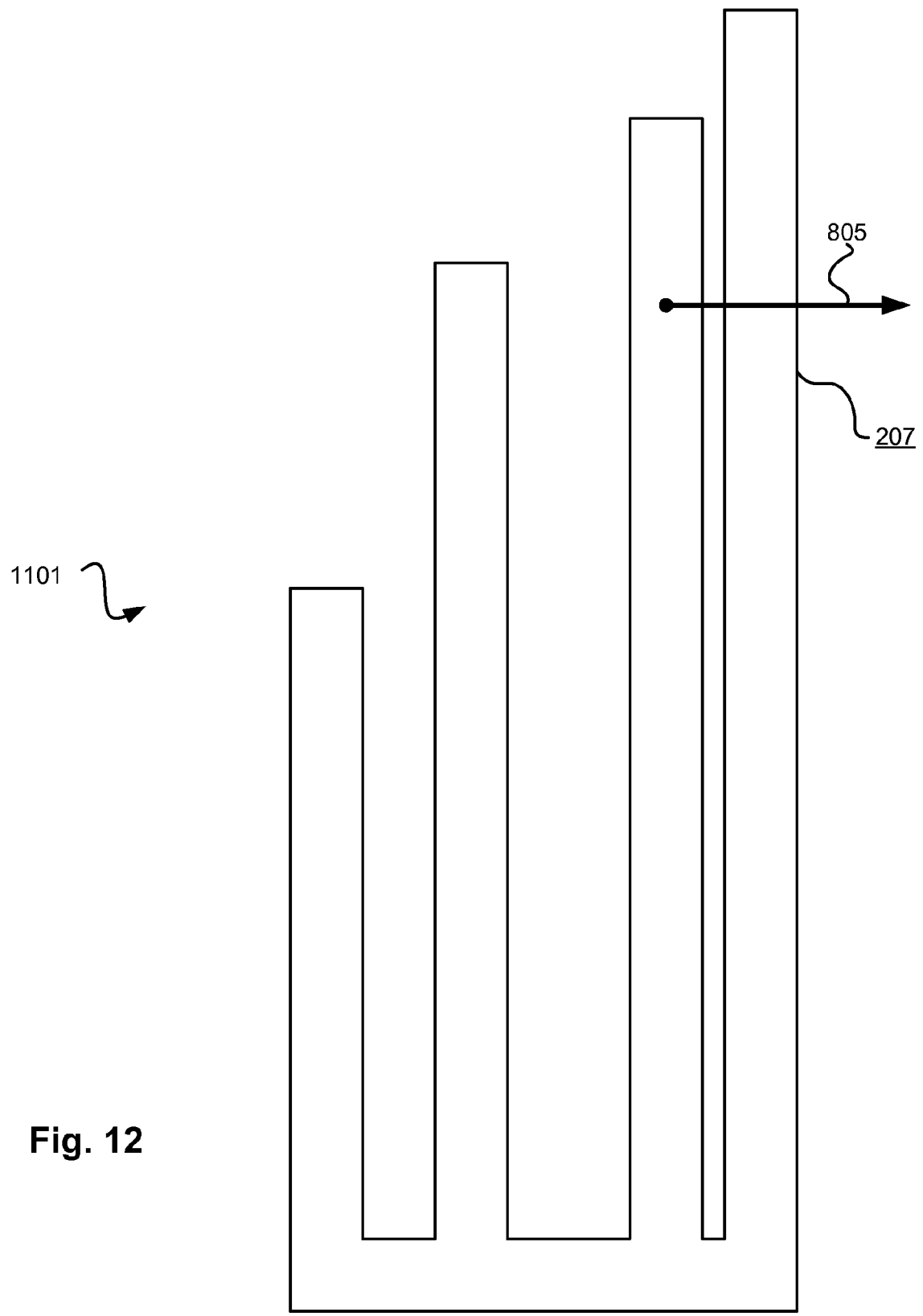
FIG. 12 illustrates the example microdevice design layout of FIG. 2 with a possible adjustment to the shapes implemented.
Figure 13:
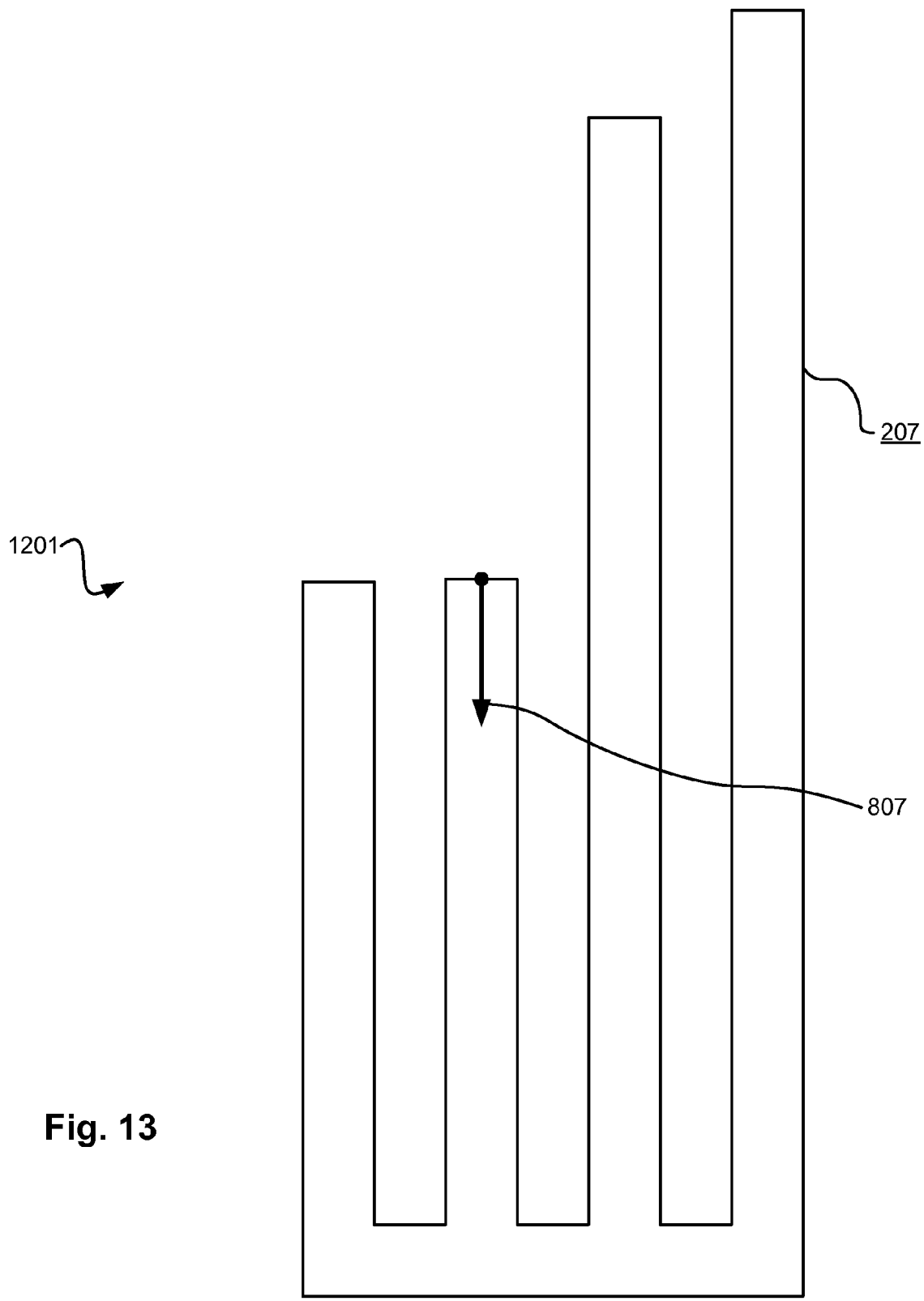
FIG. 13 illustrates the example microdevice design layout of FIG. 2 with a possible adjustment to the shapes implemented.
Figure 14:
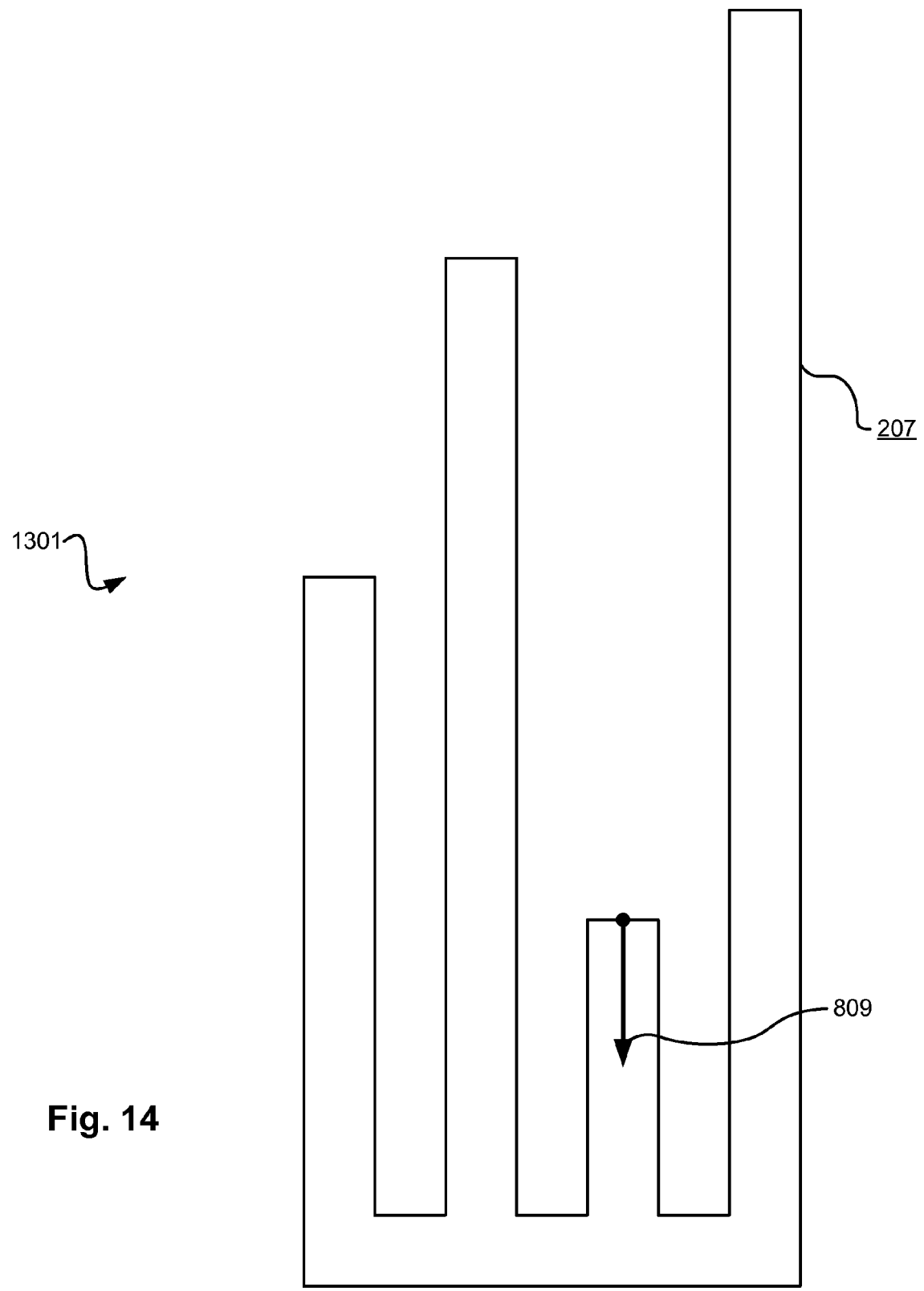
FIG. 14 illustrates the example microdevice design layout of FIG. 2 with a possible adjustment to the shapes implemented.

FIG. 10 illustrates the microdevice design layout 201 of FIG. 2. The microdevice design layout 201 illustrated in FIG. 10 includes the potential manufacturing fault 203, as well as hints 803, 805, 807, and 809. FIG. 11 illustrates a microdevice design layout 1001, derived from the microdevice design layout 201 of FIG. 2 with the hint 803 applied to the microdevice design layout 201. FIG. 12 illustrates a microdevice design layout 1101, derived from the microdevice design layout 201 of FIG. 2 with the hint 805 applied to the microdevice design layout 201. FIG. 13 illustrates a microdevice design layout 1201, derived from the microdevice design layout 201 of FIG. 2 with the hint 807 applied to the microdevice design layout 201. FIG. 14 illustrates a microdevice design layout 1301, derived from the microdevice design layout 201 of FIG. 2 with the hint 809 applied to the microdevice design layout 201.

FIGS. 10 through 14 illustrate applying various implementations of the present invention to a microdevice design layout. Furthermore FIGS. 10 through 14 illustrate selecting a set of possible adjustments to the microdevice design layout, to resolve a potential manufacturing fault.

CONCLUSION

Although certain devices and methods have been described above in terms of the illustrative embodiments, a person of ordinary skill in the art will recognize that other embodiments, examples, substitutions, modification and alterations are possible. It is intended that the following claims cover such other embodiments, examples, substitutions, modifications and alterations within the spirit and scope of the claims.

TABLE 1

| 13.615 | 16.395 | 13.615 | 17.595 | 0.0237  | 0 | 0.0676  |
|--------|--------|--------|--------|---------|---|---------|
| 13.415 | 16.395 | 13.415 | 17.110 | 0.1111  | 0 | 0.1446  |
| 14.015 | 16.295 | 14.015 | 17.995 | 0.0036  | 0 | 0.4475  |
| 13.815 | 16.395 | 13.815 | 17.795 | 0.0020  | 0 | 0.8153  |
| 13.615 | 17.595 | 13.515 | 17.595 | 0.0011  | 3 | 1.4408  |
| 13.515 | 17.815 | 13.515 | 18.335 | 0.0001  | 0 | 12.6474 |
| 13.415 | 17.795 | 13.215 | 17.795 | −0.0006 | 2 | 2.5876  |
| 13.815 | 17.795 | 13.715 | 17.795 | −0.0008 | 2 | 2.1016  |
| 13.215 | 17.795 | 13.215 | 17.995 | −0.0009 | 1 | 1.8240  |
| 13.615 | 17.815 | 13.515 | 17.815 | −0.0026 | 2 | 0.6264  |
| 13.415 | 17.615 | 13.415 | 17.795 | −0.0026 | 1 | 0.6230  |
| 13.115 | 17.615 | 13.415 | 17.615 | −0.0031 | 3 | 0.5161  |
| 13.415 | 17.110 | 13.315 | 17.11  | −0.0068 | 2 | 0.2347  |

TABLE 2

| 13.615 | 17.595 | 13.515 | 17.595 | 0.0021  | 3 | 0.7658  |
|--------|--------|--------|--------|---------|---|---------|
| 13.815 | 17.595 | 13.715 | 17.795 | 0.0004  | 3 | 3.9939  |
| 13.415 | 17.795 | 13.215 | 17.795 | 0.0003  | 3 | 4.8937  |
| 13.215 | 17.795 | 13.215 | 17.995 | −0.0001 | 1 | 13.7094 |
| 14.015 | 16.295 | 14.015 | 17.995 | −0.0004 | 1 | 3.9599  |
| 13.515 | 17.815 | 13.515 | 18.335 | −0.0010 | 1 | 1.6547  |
| 13.115 | 17.615 | 13.415 | 17.615 | −0.0012 | 3 | 1.3379  |
| 13.415 | 17.110 | 13.315 | 17.110 | −0.0023 | 2 | 0.6821  |
| 13.415 | 17.615 | 13.415 | 17.795 | −0.0029 | 1 | 0.5526  |
| 13.615 | 17.815 | 13.515 | 17.815 | −0.0031 | 2 | 0.5207  |
| 13.415 | 16.395 | 13.415 | 17.110 | −0.0100 | 1 | 0.1607  |
| 13.815 | 16.395 | 13.815 | 17.795 | −0.0124 | 1 | 0.1287  |
| 13.615 | 16.395 | 13.615 | 17.595 | −0.0943 | 1 | 0.0170  |

What is claimed is:

1. A computer-implemented method of selecting a set of possible adjustments to apply to mask design data used for creating a mask that can be employed in a photolithographic system, the method comprising:
   reading all or a portion of a mask design, the mask design defining a plurality of shapes of geometric patterns and including a potential manufacturing fault;
   identifying a subset of the plurality of shapes that neighbor the potential manufacturing fault:
   determining, on a computer, a contribution of the subset of the plurality of shapes upon the potential manufacturing fault, wherein the determining is performed based in part upon a model:
   simulating, on a computer, a plurality of possible adjustments to the subset of the plurality of shape, wherein the simulating is performed based in part upon the model: and
   saving the plurality of possible adjustments to a memory location.

2. The method recited in claim 1, wherein the method act of simulating, on a computer, a plurality of possible adjustments to the subset of the plurality of shapes comprises:
   selecting a first possible adjustment, the first possible adjustment comprising:
      selecting a first portion of a first shape from the subset of the plurality of shapes for adjustment;
      selecting an adjustment to apply to the first portion of the first shape;
      employing the model to simulate an effect of the first possible adjustment upon the potential manufacturing fault;
   selecting a second possible adjustment, the second possible adjustment comprising:
      selecting a first portion of a second shape from the subset of the plurality of shapes for adjustment;
      selecting an adjustment to apply to the first portion of the second shape; and employing the model to simulate an effect of the second possible adjustment upon the potential manufacturing fault.

3. The method recited in claim 1, wherein the method act of simulating on a computer a plurality of possible adjustments to the subset of comprises:
selecting a first possible adjustment, the first possible adjustment comprising:
selecting a first portion of a first shape from the subset of the plurality of shapes for adjustment;
selecting an adjustment to apply to the first portion of the first shape;
employing the model to simulate an effect of the first possible adjustment upon the potential manufacturing fault;
selecting a second possible adjustment, the second possible adjustment comprising:
selecting a second portion of the first shape from the subset of the plurality of shapes for adjustment;
selecting an adjustment to apply to the second portion of the first shape; and
employing the model to simulate an effect of the second possible adjustment upon the potential manufacturing fault.

4. The method recited in claim 3, further comprising:
selecting a third possible adjustment, the third possible adjustment comprising:
selecting a first portion of a second shape from the subset of the plurality of shapes for adjustment;
selecting an adjustment to apply to the first portion of the second shape; and
employing the model to simulate an effect of the third possible adjustment upon the potential manufacturing fault.

5. The method recited in claim 4, wherein the plurality of shapes are edges.

6. The method recited in claim 5, further comprising:
ranking the first possible adjustment, the second possible adjustment, and the third possible adjustment.

7. The method recited in claim 6, further comprising:
saving results of the ranking of possible adjustments to a memory location.

8. The method recited in claim 7, wherein the method act of saving the results of the ranking of possible adjustments to a memory location comprises:
compiling a set of ranked possible adjustments into a relational database file; and
saving the relational database file to a memory location.

9. The method recited in claim 4, wherein the plurality of shapes are edge fragments.

10. The method recited in claim 4, wherein the plurality of shapes are entire polygons.

11. The method recited in claim 1, further comprising:
determining a density of at least a part of the mask design;
determining a contour of at least a part of the mask design; and
calibrating the model based at least in part on the density and the contour.

12. The method recited in claim 11, wherein the model has a form selected from the group consisting of polynomial, taylor series expansion, linear, and cross-term.

13. The method recited in claim 11, further comprising: calibrating the model with a least squares method.

14. The method recited in claim 1, wherein the method act of determining, on a computer, a contribution of the subset of the plurality of shapes upon the potential manufacturing fault comprising:
determining a density of at least a portion of the mask design;
determining a contour of at least a portion of the mask design; and
determining a sensitivity factor of the potential manufacturing fault to at least one shape from the subset of the plurality of shapes, wherein the determining is performed based at least in part upon the density and the contour.

15. A computer readable storage device having instructions executable by a computing device stored thereon, comprising:
instructions for causing a computer to perform a set of operations,
the set of operations comprising:
reading all or a portion of a mask design, the mask design defining a plurality of shapes of geometric patterns and including a potential manufacturing fault;
identifying a subset of the plurality of shapes that neighbor the potential manufacturing fault;
determining a contribution of the subset of the plurality of shapes upon the potential manufacturing fault, wherein the determining is performed based in part upon a model;
simulating a plurality of possible adjustments to the subset of the plurality of shapes, wherein the simulating is performed based in part upon the model; and
saving the plurality of possible adjustments to a memory location.

16. The computer readable storage device recited in claim 15, wherein the operation for simulating a plurality of possible adjustments to the subset the plurality of shape comprising:
selecting a first possible adjustment, the first possible adjustment comprising:
selecting a first portion of a first shape from the subset of the plurality of shapes for adjustment;
selecting an adjustment to apply to the first portion of the first shape;
employing the model to simulate an effect of the first possible adjustment upon the potential manufacturing fault;
selecting a second possible adjustment, the second possible adjustment comprising:
selecting a first portion of a second shape from the subset of the plurality of shapes for adjustment;
selecting an adjustment to apply to the first portion of the second shape; and
employing the model to simulate an effect of the second possible adjustment upon the potential manufacturing fault.

17. The computer readable storage device recited in claim 15, wherein the operation for simulating a plurality of possible adjustments to the subset the plurality of shapes comprising:
selecting a first possible adjustment, the first possible adjustment comprising:
selecting a first portion of a first shape from the subset of the plurality of shapes for adjustment;

selecting an adjustment to apply to the first portion of the first shape;

employing the model to simulate an effect of the first possible adjustment upon the potential manufacturing fault;

selecting a second possible adjustment, the second possible adjustment comprising:

selecting a second portion of the first shape for adjustment;

selecting an adjustment to apply to the second portion of the first shape; and employing the model to simulate an effect of the second possible adjustment upon the potential manufacturing fault.

18. The computer readable storage device recited in claim 17, wherein the operation for simulating a plurality of possible adjustments to the subset of the plurality of shapes further comprising:

selecting a third possible adjustment, the third possible adjustment comprising:

selecting a first portion of a second shape from the subset of the plurality of shapes for adjustment;

selecting an adjustment to apply to the first portion of the second shape; and employing the model to simulate an effect of the third possible adjustment upon the potential manufacturing fault.

19. The computer readable storage device recited in claim 18, wherein the plurality of shapes are edges.

20. The computer readable storage device recited in claim 19, the set of operations further comprising:

ranking the first possible adjustment, the second possible adjustment, and the third possible adjustment.

21. The computer readable storage device recited in claim 20, the set of operations further comprising:

saving results of the ranking of possible adjustments to a memory location.

22. The computer readable storage device recited in claim 21, wherein the operation for saving the results of the ranking of possible adjustments to a memory location comprises:

compiling a set of ranked possible adjustments into a relational database file; and saving the relational database file to a memory location.

23. The computer readable storage device recited in claim 18, wherein the plurality of shapes are edge fragments.

24. The computer readable storage device recited in claim 18, wherein the plurality of shapes are entire polygons.

25. The computer readable storage device recited in claim 15, the set of operations further comprising:

determining a density of at least a part of the mask design;

determining a contour of at least a part of the mask design; and calibrating the model based at least in part on the density and the contour.

26. The computer readable storage device recited in claim 25, wherein the model has a form selected from the group consisting of polynomial, taylor series expansion, linear, and cross-term.

27. The computer readable storage device recited in claim 25, the set of operations further comprising:

calibrating the model with a least squares method.

28. The computer readable storage device recited in claim 15, wherein the operation for determining a contribution of the subset of the plurality of shapes upon the potential fault comprises:

determining a density of at least a portion of the mask design;

determining a contour of at least a portion of the mask design; and determining a sensitivity factor of the potential manufacturing fault to at least one shape from the subset of the plurality of shapes, wherein the determination is performed based at least in part upon the density and the contour.

* * * * *